United States Patent
Ting et al.

(10) Patent No.: US 11,760,656 B2
(45) Date of Patent: Sep. 19, 2023

(54) HIGH ENTROPY COMPOSITE OXIDE, MANUFACTURING METHOD THEREOF, AND ANODE MATERIALS COMPRISING THE SAME

(71) Applicant: NATIONAL CHENG KUNG UNIVERSITY, Tainan (TW)

(72) Inventors: Jyh-Ming Ting, Tainan (TW); Thi-Xuyen Nguyen, Tainan (TW); Jeng-Kuei Chang, Tainan (TW); Jagabandhu Patra, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 135 days.

(21) Appl. No.: 17/202,638

(22) Filed: Mar. 16, 2021

(65) Prior Publication Data
US 2022/0135426 A1    May 5, 2022

(30) Foreign Application Priority Data

Oct. 29, 2020   (TW) ................................ 109137667

(51) Int. Cl.
*C01G 53/00*   (2006.01)

(52) U.S. Cl.
CPC ........ *C01G 53/006* (2013.01); *C01P 2002/32* (2013.01); *C01P 2004/51* (2013.01); *C01P 2004/62* (2013.01)

(58) Field of Classification Search
None
See application file for complete search history.

(56) References Cited

FOREIGN PATENT DOCUMENTS

| CN | 108821351 A | * | 11/2018 | ............. B82Y 30/00 |
| CN | 111333124 A | * | 6/2020 | ........... B01J 20/0229 |

OTHER PUBLICATIONS

Nguyen, et al. "High entropy spinel oxide nanoparticles for superior lithiation-delithiation performance", J. Mater. Chem. A, 2020, 8, 18963.

* cited by examiner

Primary Examiner — Daniel S Gatewood
(74) Attorney, Agent, or Firm — AMIN, TUROCY & WATSON, LLP

(57) ABSTRACT

Provided is a high entropy composite oxide of formula $([M_1]_p Mn_q Fe_x Cr_y Ni_z)_3 O_4$ having a spinel crystal, wherein the $[M_1]$, p, q, x, y and z are as defined in the specification. A method for producing the high entropy composite oxide, and anode materials including the same are further provided. With the entropy stabilization effect and plenty of oxygen vacancies, the anode materials including the high entropy composite oxide show the advantage of high $Li^+$ transport rate, high electric capacity, redox durability, and good cycling stability, thereby having a bright prospect for application.

18 Claims, 13 Drawing Sheets preparing a reaction solution — S11 subjecting to a hydrothermal reaction — S12 separating to obtain the high-entropy composite oxide — S13

HIGH ENTROPY COMPOSITE OXIDE, MANUFACTURING METHOD THEREOF, AND ANODE MATERIALS COMPRISING THE SAME

CROSS-REFERENCE TO RELATED APPLICATION

The present application is based on, and claims priority from, Taiwan Application Serial Number 109137667, filed on Oct. 29, 2020, the disclosure of which is hereby incorporated by reference herein in its entirety.

BACKGROUND

1. Technical Field

The present disclosure relates to alloy materials and anode materials in the electrochemical field, and more particularly, to a composite oxide and anode material for a lithium-ion secondary battery.

2. Description of Related Art

High entropy alloy (HEA) materials refer to an alloy material containing more than four main elements, and each main element does not exceed about 35%, so it can give a full play to the high-entropy effect caused by multiple elements, thereby improving the material's toughness, fracture resistance, tensile strength, corrosion resistance and oxidation resistance, break through the performance and service life limits of traditional alloy materials, and show endless application potential in the fields of energy, aerospace, semiconductor/electronics, etc.

In the current technology of lithium-ion batteries, although there are researches suggesting the application of a (MgCoNiCuZn)O high-entropy alloy material to anode materials brings about the effect of improving lithium-ion conductivity over a traditional electrode, such high-entropy alloy materials must rely on the inactive material MgO to stabilize the structure to ensure the stability of the electrode cycle. However, the inactive material is a virtual component in the anode material that reduces the specific capacitance of the lithium-ion battery, and it is difficult to improve its overall performance.

In view of the foregoing, it is necessary to propose a high-entropy alloy material and an anode material comprising the same to produce a lithium-ion battery with high specific capacitance, high lithium-ion conductivity and good cycle stability, so as to meet the actual requirements of current applications.

SUMMARY

In order to solve the problems of the above-mentioned conventional technology, the present disclosure provides a high-entropy composite oxide having a spinel crystal, and represented by the following formula:

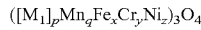

wherein the $[M_1]$ is Co or Ti;
$0.2 \leqslant p \leqslant 0.35$, $0.2 \leqslant q \leqslant 0.4$, $0.07 \leqslant x \leqslant 0.2$, $0.1 \leqslant y \leqslant 0.2$, $0.15 \leqslant z \leqslant 0.25$, and $p+q+x+y+z=1$, and the p, q, x, y and z are not the same value.

In an embodiment of the present disclosure, the spinel crystal has an $AB_2O_4$ structure, wherein the A contains $[M_1]^{2+}$, $Fe^{2+}$, $Mn^{2+}$ and $Ni^{2+}$, the B contains $[M_1]^{3+}$, $Fe^{3+}$, $Mn^{3+}$, $Ni^{3+}$ and $Cr^{3+}$, and the $[M_1]$ is Co or Ti.

In another embodiment of the present disclosure, the spinel crystal is a crystal of single-phase cubic spinel with Fd-3m space group.

In an embodiment of the present disclosure, the high entropy composite oxide has particles with a number average particle size of 100 to 300 nanometers, wherein the size distribution of the particles is the number average particle size±50 nm.

The present disclosure further provides a method for preparing the above-mentioned high entropy composite oxide, comprising: subjecting the reaction solution to a hydrothermal reaction, wherein the reaction solution includes a precursor salt, an oxidizer, and a surfactant dissolved therein, and the precursor salt includes a metal salt containing a $[M_1]^{2+}$-containing metal salt, a $Mn^{2+}$-containing metal salt, a $Ni^{2+}$-containing metal salt, a $Fe^{3+}$-containing metal salt, and a $Cr^{3+}$-containing metal salt, and the $[M_1]$ is a metal ion of Co or Ti; and separating to obtain the high entropy composite oxide from the reaction solution after the hydrothermal reaction.

In an embodiment of the present disclosure, the reaction solution is prepared by dissolving the surfactant and the precursor salt in a solvent, and then introducing the oxidizer into the solvent.

In an embodiment of the present disclosure, the solvent is at least one selected from the group consisting of deionized water, isopropanol, ethanol and dimethylformamide.

In an embodiment of the present disclosure, the oxidizer is one selected from the group consisting of urea, sodium hydroxide, potassium hydroxide and ammonia. In another embodiment of the present disclosure, the molar ratio of the oxidizer to the precursor salt is 1:1 to 7:1.

In an embodiment of the present disclosure, the metal salt is any one selected from the group consisting of metal nitrates, metal halides, metal acetates, and metal sulfates, and the molarity of the precursor salt in the reaction solution is 0.0125 to 0.25M.

In an embodiment of the present disclosure, the surfactant is one selected from the group consisting of cetyltrimethylammonium bromide, ammonium fluoride and citric acid; in another embodiment of the present disclosure, the molar ratio of the surfactant to the precursor salt is 1:1.6 to 1:10.

In an embodiment of the present disclosure, the temperature of the hydrothermal reaction is 120 to 200° C., and the reaction time is 4 to 24 hours.

In an embodiment of the present disclosure, the method of the present disclosure further comprises subjecting the high-entropy composite oxide to a heat treatment after separating and obtaining the high-entropy composite oxide, wherein the heat treatment is to treat the high-entropy composite oxide at 400 to 1000° C. for 2 to 10 hours.

The present disclosure further provides an anode material for a lithium-ion secondary battery, comprising the above-mentioned high entropy composite oxide, wherein the weight percentage of the high entropy composite oxide in the anode material is 70 to 80% by weight.

According to the present disclosure, through non-isomolar ratio design of the high-entropy composite oxide, the various valence states of cations are dispersed in the crystal structure to promote the formation of a large number of oxygen vacancies, which can serve as a three-dimensional lithium-ion transmission channel and effectively enhance the lithium-ion conductivity thereof to let the anode material have a high rate of charge and discharge capability and increase the specific capacitance of the lithium-ion battery.

On the other hand, the high-entropy composite oxide of the present disclosure has a spinel crystal, which increases the configuration entropy of the high-entropy composite oxide, and its entropy stabilization effect is beneficial to the regenerative behavior of the high-entropy composite oxide during the lithiation and delithiation process, providing an anode material comprising the high-entropy composite oxide with redox durability and excellent cycle stability, thereby having a prospect of the application.

BRIEF DESCRIPTION OF THE DRAWINGS

The implementation modes of the present disclosure will be described through exemplary drawings.

DETAILED DESCRIPTION OF THE EMBODIMENTS

Figure 1:
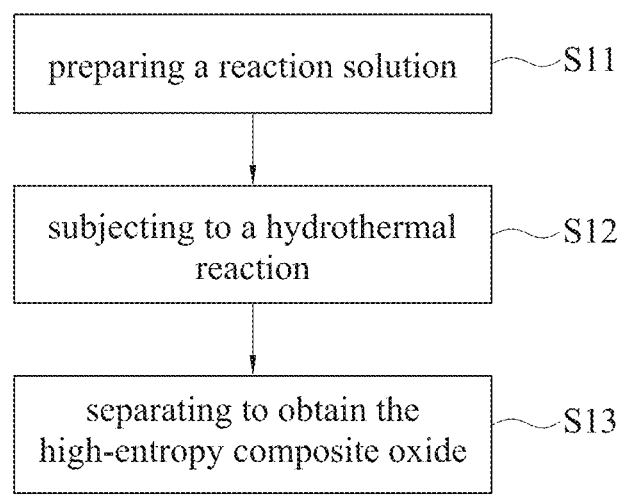
FIG. 1 is a flow chart of the method for preparing the high-entropy composite oxide of the present disclosure.

The implementation modes of the present disclosure will be illustrated by following specific embodiments, any one skilled in the art could easily realize the advantages and effects of the present disclosure based on the disclosure of the present specification. The present disclosure can also be performed or applied by other different implementation modes, and each of the details in the present specification each may be differently modified and altered based on different views and applications, without departing from the spirit of the present disclosure. Furthermore, all of the ranges and values herein are inclusive and combinable. Any value or point fallen within the disclosed herein, such as any integers, may be used as the lower or upper limit to derive a subrange.

According to the present disclosure, a high-entropy composite oxide having spinel crystal, and represented by the following formula (I):

$$([M_1]_p Mn_q Fe_x Cr_y Ni_z)_3 O_4 \quad (I)$$

wherein the $[M_1]$ is Co or Ti;
$0.2 \leqslant p \leqslant 0.35$, $0.2 \leqslant q \leqslant 0.4$, $0.07 \leqslant x \leqslant 0.2$, $0.1 \leqslant y \leqslant 0.2$, $0.15 \leqslant z \leqslant 0.25$, and $p+q+x+y+z=1$, and the p, q, x, y, z are not the same value.

The high-entropy composite oxide of the present disclosure is a high-entropy alloy material containing five different elements. Compared with traditional alloy materials, it has higher configuration entropy, such that it exhibits excellent oxidation-reduction resistance and structural stability to extend its service life.

In the high-entropy composite oxide of the present disclosure, p, q, x, y, and z are not all the same number, which is a design of non-equal molar ratio, for example, the two may be the same ratio. With such design, the ratio of dispersed cations varies in the spinel crystal structure, increases the configuration entropy, generates a large number of oxygen vacancies, and forms a unique three-dimensional lithium-ion transmission channel, which effectively increases the lithium-ion conductivity rate and provides the anode material with a high-rate charge discharge capability, and improved its reversible capacity in the lithiation and delithiation process, so that the specific capacity of the lithium-ion battery is significantly increased.

In a specific embodiment, $[M_1]$ in the high-entropy composite oxide represented by formula (I) is Co or Ti; $0.23 \leq p \leq 0.32$, $0.23 \leq q \leq 0.32$, $0.08 \leq x \leq 0.15$, $0.12 \leq y \leq 0.15$, $0.16 \leq z \leq 0.23$, and $p+q+x+y+z=1$, and the p, q, x, y, and z are not the same value.

In a specific embodiment, the spinel crystal of the present disclosure has an $AB_2O_4$ structure, wherein the A contains $[M_1]^{2+}$, $Fe^{2+}$, $Mn^{2+}$ and $Ni^{2+}$, and the B contains $[M_1]^{3+}$, $Fe^{3+}$, $Mn^{3+}$, $Ni^{3+}$ and $Cr^{3+}$, and the $[M_1]$ is Co or Ti.

As used herein, the term "the spinel crystal with $AB_2O_4$ structure" means that the crystal in the high-entropy composite oxide has a crystal structure of a three-dimensional equiaxed crystal structure similar to that of magnesium aluminum spinel ($MgAl_2O_4$). The unit cell in the crystal of the present disclosure includes interphase tetrahedrons and octahedrons, wherein the oxygen ions are arranged in a cubic close packing, the divalent cations are filled in the tetrahedral voids, and the trivalent cations are filled in the octahedral voids. But the unit cell is not limited to the valence ions above-mentioned, but also includes the distortion structure of other tetravalent or hexavalent cations.

In a specific embodiment, the spinel crystal is a crystal of single-phase cubic spinel with Fd-3m space group.

The valence state of each metal element in the high-entropy composite oxide may be observed through high-resolution X-ray photoelectron spectroscopy (XPS) analysis, and the valence state ratio may be measured.

In a specific embodiment, for the observation of the element valence state in the high-entropy composite oxide represented by $(Co_{0.32}Mn_{0.32}Fe_{0.08}Cr_{0.12}Ni_{0.16})_3O_4$, it is found that the Co element exists simultaneously as divalent and trivalent ions, Mn element exists simultaneously as divalent, trivalent and tetravalent ions, Fe exists simultaneously as divalent and trivalent ions, Cr exists simultaneously as trivalent and hexavalent ions, and Ni element exists simultaneously as divalent ions and trivalent ions existed.

Due to the metal elements of the high-entropy composite oxide of the present disclosure with various valence states, not only the change window of the valence state of the cation increases, but also the configuration entropy increases. The formation of a large number of oxygen vacancies is facilitated, thereby effectively improving the lithium-ion conductivity thereof.

The surface morphology and particle size of the high-entropy composite oxide may be observed through a scanning electron microscope (SEM).

In a specific embodiment, the high-entropy composite oxide has particles with an average particle size of 100 to 300 nanometers.

In other embodiments, the number average particle size of the high-entropy composite oxide may be 110, 120, 130, 140, 150, 160, 170, 180, 190, 200, 230, 250, 270, 280, or 290 nanometers, but not limited thereto. In addition, the numerical value may be the upper limit or the lower limit of the number average particle size, for example, the high-entropy composite oxide has a particle with a number average particle size of 100 to 200 nm.

In another embodiment, the size distribution of the particles of the high-entropy composite oxide is 170±50 nanometers, indicating that the high-entropy composite oxide has extremely high uniformity.

Regarding the above-mentioned high-entropy composite oxide, the present disclosure provides a method for preparing the above-mentioned high-entropy composite oxide. Please refer to FIG. 1, which illustrates the flow of the method for preparing the high-entropy composite oxide of the present disclosure. First, a reaction solution is prepared (step S11); then, the reaction solution is subjected to a hydrothermal reaction (step S12); and the high-entropy composite oxide is separated and obtained from the reaction solution after the hydrothermal reaction (step S13).

The reaction solution is a solution in which the precursor salt, oxidizer and surfactant are dissolved. In a specific embodiment, the reaction solution is prepared by dissolving the surfactant and precursor salt in a solvent, and then introducing the oxidizer into the solvent.

In another embodiment, the process of preparing the reaction solution further comprises stirring the reaction solution to completely dissolve the reaction solution into a homogeneous phase.

The solvent is at least one selected from the group consisting of deionized water, isopropanol, ethanol and dimethylformamide. In a specific embodiment, the solvent is deionized water.

As used herein, the term "hydrothermal reaction" refers to a method of preparing material in a closed container, the water therein used as a solvent, and the pressure increases as the temperature rises, which causes the precursor salt to undergo combination, decomposition, and crystallization. In a specific embodiment, the temperature of the hydrothermal reaction is 120 to 200° C., and the time is 4 to 24 hours.

In other embodiments, the temperature of the hydrothermal reaction may be 130, 140, 150, 160, 170, 180, or 190° C.; and the treatment time may be 5, 6, 7, 8, 9, 10, 11, 12, 15, 18, or 21 hours, but not limited thereto.

The precursor salt includes a $[M_1]^{2+}$-containing metal salt, a $Mn^{2+}$-containing metal salt, a $Ni^{2+}$-containing metal salt, a $Fe^{3+}$-containing metal salt, and a $Cr^{3+}$-containing metal salt, and the $[M_1]$ is a metal ion containing Co or Ti. In a specific embodiment, the metal salt is any one selected from the group consisting of metal nitrates, metal halides, metal acetates, and metal sulfates, and the molarity of the precursor salt in the reaction solution is 0.0125 to 0.25M.

In other embodiments, the molarity of the precursor salt in the reaction solution may be 0.02, 0.03, 0.04, 0.05, 0.06, 0.07, 0.08, 0.1, 0.15, or 0.2 M, but not limited thereto.

The metal halide is any one selected from of the group consisting of metal fluoride, metal chloride, metal bromide, and metal iodide; and in a specific embodiment, the metal halide is a metal chloride.

In another embodiment, the precursor salt includes $Co^{2+}$-containing nitrate, $Mn^{2+}$-containing nitrate, $Ni^{2+}$-containing nitrate, $Fe^{3+}$-containing nitrate, and $Cr^{3+}$-containing nitrate, and the molarity of the precursor salt in the reaction solution is 0.0125 to 0.25M.

As used herein, the term "oxidizer" is to further oxidize the metal element to form a metal oxide powder with the desired form of crystal. In a specific embodiment, the oxidizer is one selected from the group consisting of urea, sodium hydroxide, potassium hydroxide and ammonia.

In another embodiment, the oxidizer is urea.

In a specific embodiment, the molar ratio of the oxidizer to the precursor salt is 1:1 to 7:1. In other embodiments, the molar ratio of the oxidizer to the precursor salt may be 2:1, 3:1, 4:1, 5:1, or 6:1, but not limited thereto.

As used herein, the term "surfactant" is used as a molding template to guide the shape and size of forming nano-scale particles to provide a high-entropy composite oxide with a higher level of particle size uniformity. In a specific embodiment, the surfactant is one selected from the group consisting of cetyltrimethylammonium bromide (CTAB), ammonium fluoride and citric acid.

In another embodiment, the surfactant is selected from cetyltrimethylammonium bromide.

In a specific embodiment, the molar ratio of the surfactant to the precursor salt is 1:1.6 to 1:10. In other embodiments, the molar ratio of the surfactant to the precursor salt may be 1:2, 1:3, 1:4, 1:5, 1:6, 1:7, 1:8 or 1:9, but not limited thereto.

The preparation method of the present disclosure further comprises subjecting the high-entropy composite oxide to a heat treatment after the separation procedure to further fragment the agglomerated sub-micron high-entropy composite oxide into nano-scale particles.

In a specific embodiment, the temperature of the heat treatment is 400 to 1000° C., and the treatment time is 2 to 10 hours. If the temperature of the heat treatment is less than 400° C., the metal carbonate remains in the product, which further affects the performance of the anode material.

In other embodiments, the temperature of heat treatment may be 500, 600, 700, 800, or 900° C.; the treatment time may be 3, 4, 5, 6, 7, 8, or 9 hours, but not limited thereto.

In another embodiment, the heat treatment temperature is greater than or equal to 400 to less than 1000° C.

In another embodiment, the temperature of the heat treatment is 900° C., so that the high-entropy composite oxide of the present disclosure forms a single-phase cubic spinel crystal with the Fd-3m space group.

On the other hand, the present disclosure also provides an anode material for a lithium-ion secondary battery, which includes the above-mentioned high-entropy composite oxide as the active material of the anode material, so that the lithium-ion transmission rate of the anode material of the present disclosure is up to $1.3 \times 10^{-12}$ $cm^2s^{-1}$. In a specific embodiment, the weight percentage of the high-entropy composite oxide in the anode material is 70 to 80% by weight.

In another embodiment, the loading amount of the high-entropy composite oxide in the anode material is 1.4 to 1.6 mg/cm$^2$.

In a specific embodiment, the anode material further includes a conductive material and an adhesive, wherein the conductive material and the adhesive may also be conventional materials.

In a specific embodiment, the conductive material is carbon black.

In another embodiment, the adhesive is polyvinylidene fluoride (PVDF).

Regarding the change in crystal structure of the anode material during charge and discharge, it may be observed by X-ray diffraction (XRD) analysis.

In a specific embodiment, according to the observation of crystal structure change, it is found that the anode material is subjected to lithiation at the same time during the charging process, but the high-entropy composite oxide of the present disclosure tends to maintain its crystal oxide. The anode material is subjected to delithiation during the discharge process. And the high-entropy composite oxide of the present disclosure shows its recovery ability, and its entropy stabilization effect is beneficial to the regeneration behavior of the high-entropy composite oxide in lithiation and delithiation, such that the anode material with the high-entropy composite oxide can perform redox resistance and excellent cycle stability.

The present disclosure will be described in detail through Examples which are not considered to limit the scope of the present disclosure.

EXAMPLES

Preparation Example 1

Preparation of High-Entropy Composite Oxide

Deionized water was used as the solvent of the reaction solution. The precursor salt contained 29.6 mol % of cobalt (II) nitrate hexahydrate, 11.1 mol % of chromium(III) nitrate nonahydrate, and 7.4 mol % of iron(III) nitrate nonahydrate, 29.6 mol % of manganese(II) nitrate hexahydrate and 22.2 mol % of nickel(II) hexahydrate. The surfactant was cetyltrimethylammonium bromide (CTAB). The oxidizer was urea.

First, the precursor salt and surfactant were dissolved in deionized water at 400 rpm with stirring to form a mixed solution. Then, the oxidizer was introduced into the mixed solution, and continued to stir for 1 hour to form a homogeneous reaction solution; wherein the molarity of the precursor salt was 0.169 M, the molar ratio of the surfactant to the precursor salt was 1:4, and the molar ratio of the oxidizer to the precursor salt is 6:1.

Then, the reaction solution was placed in a 100 mL autoclave lined with polytetrafluoroethylene, and a hydrothermal reaction was carried out at 140° C. for 5 hours.

After the hydrothermal reaction was completed, the autoclave was cooled to room temperature. The precipitate of the high-entropy composite oxide was separated from the reaction solution after the hydrothermal reaction by centrifugation. Then, the precipitate was washed with a solution containing ethanol and deionized water, and filtered, and dried in a vacuum oven for 12 hours, and then heat-treated at 900° C. for another 2 hours. The element ratio of Co:Mn:Fe:Cr:Ni in the resulting high-entropy composite oxide was 2:0.75:0.5:2:1.

Figure 2:
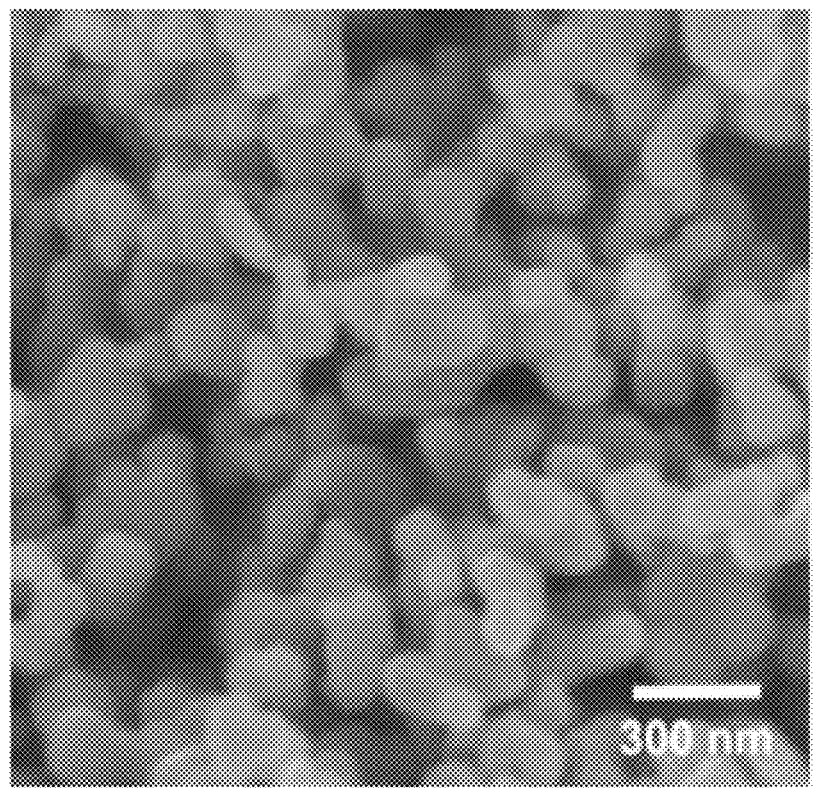
FIG. 2 is a surface topography of a high-entropy composite oxide of an embodiment of the present disclosure observed with a scanning electron microscope.

Finally, the high-entropy composite oxide prepared was analyzed as follows:

(1) Surface observation: the morphology and size of the high-entropy composite oxide was observed with a scanning electron microscope (SEM, Jiedong Co., Ltd., JEOL 6701F), and record it in FIG. 2. It shows that the high-entropy composite oxide of the present disclosure is a highly uniform particle and its number average particle size and distribution are 170±50 nm.

Figure 3:
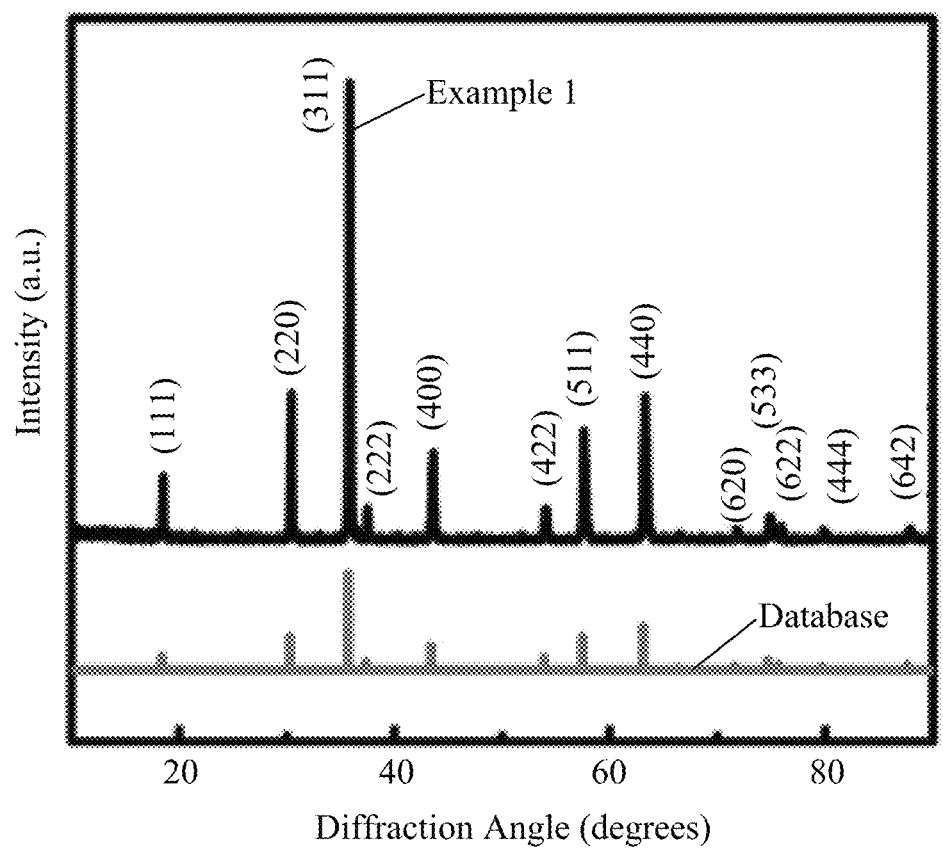
FIG. 3 is an X-ray diffraction spectrogram of a high-entropy composite oxide according to an embodiment of the present disclosure.
Figure 4A:
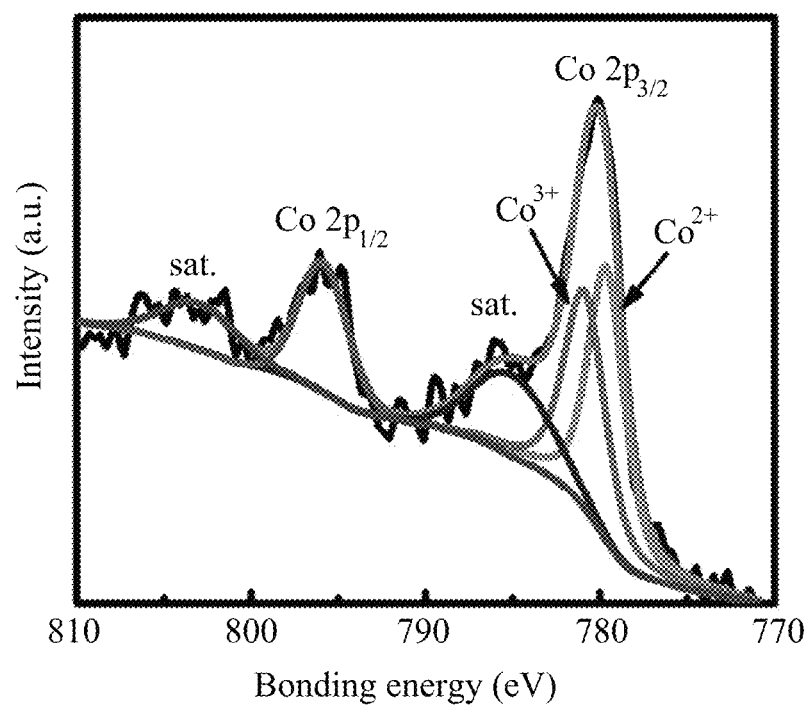
FIGS. 4A to 4F are X-ray photoelectron spectrograms of the high-entropy composite oxides according to an embodiment of the present disclosure.
Figure 4B:
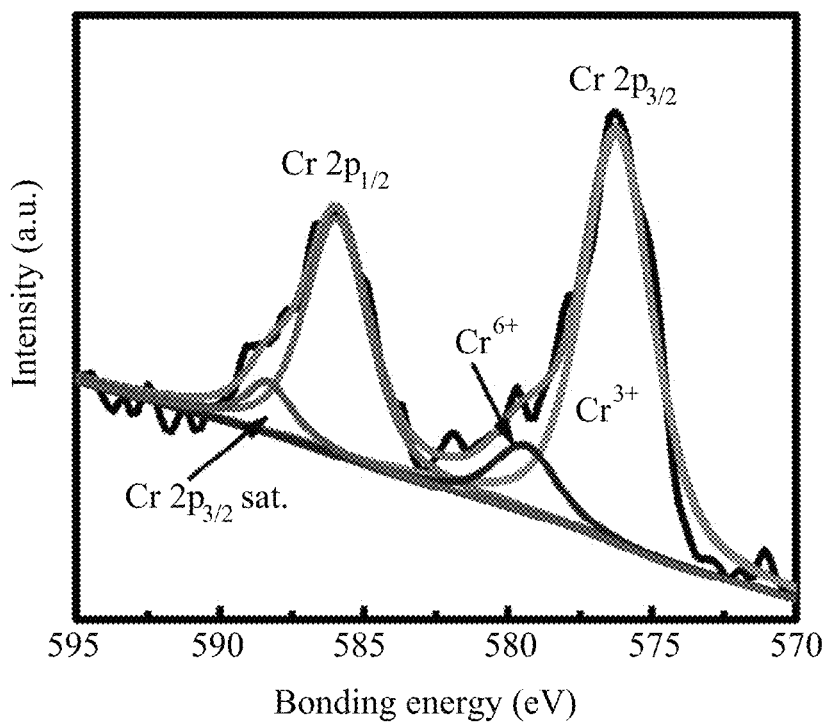
Figure 4C:
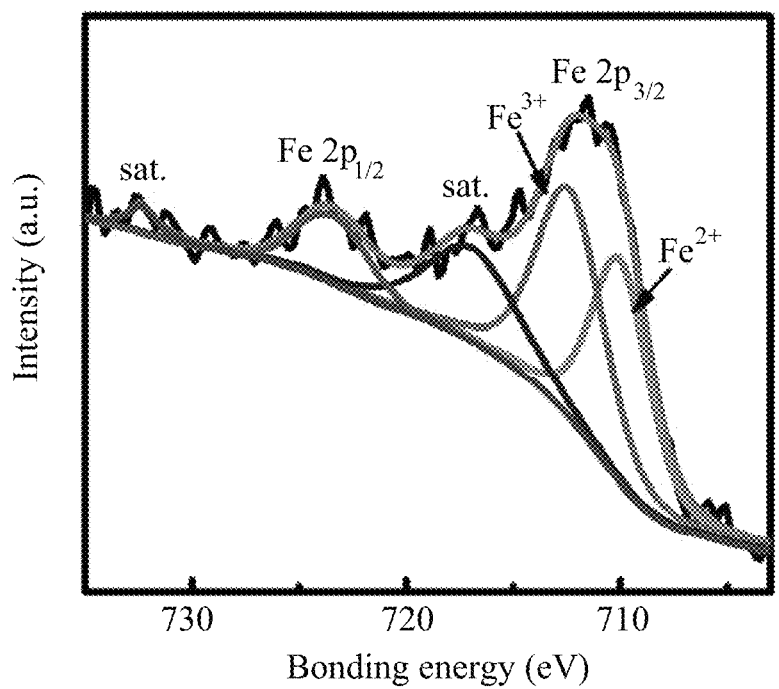
Figure 4D:
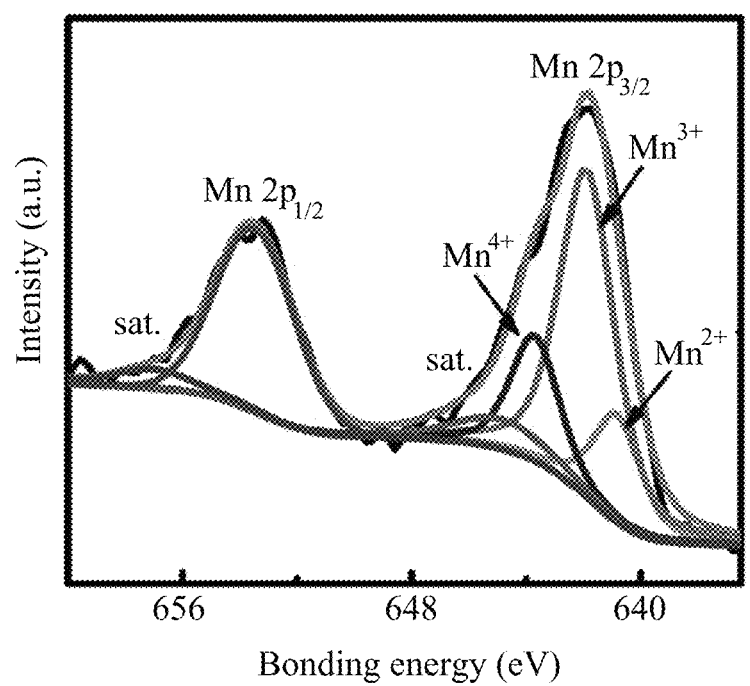
Figure 4E:
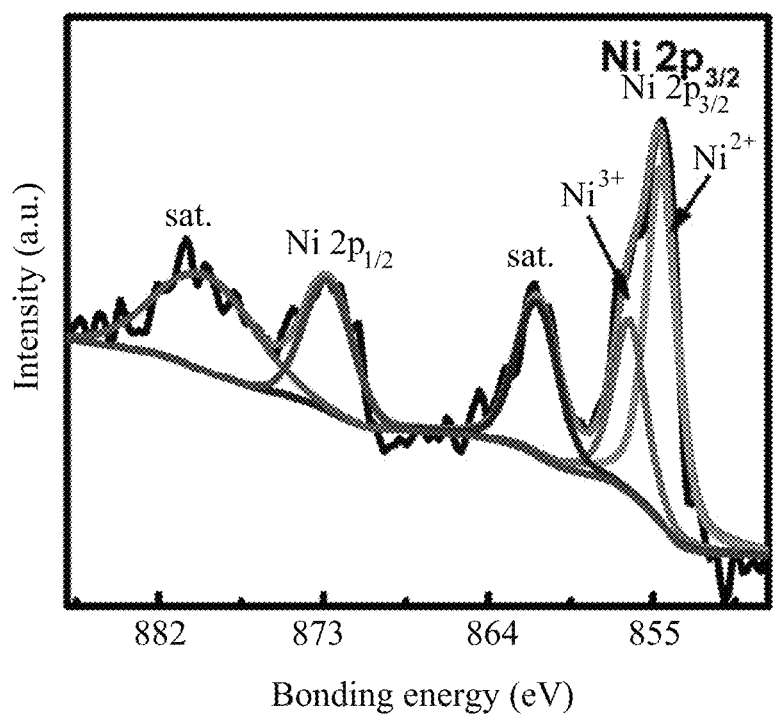
Figure 4F:
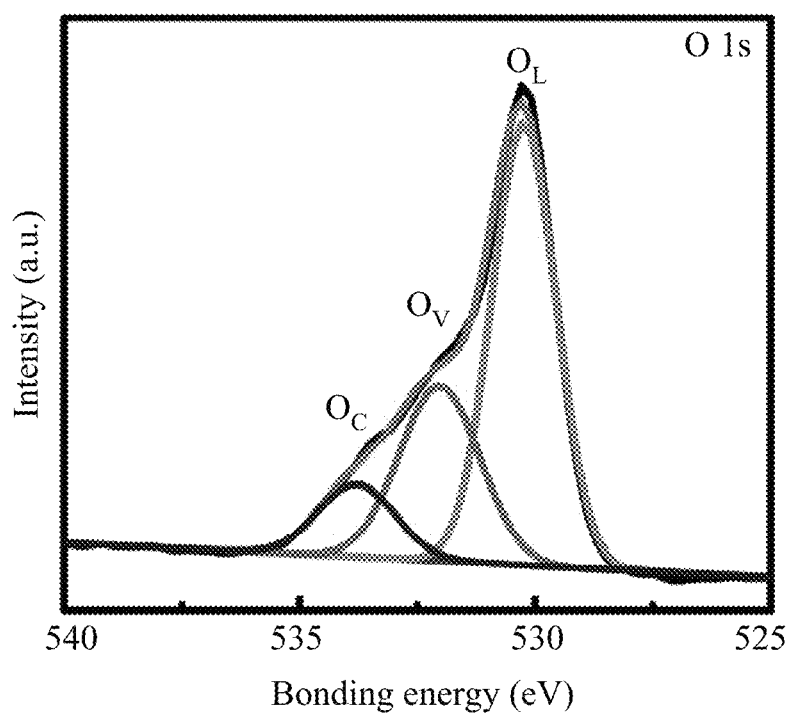

(2) Crystallinity: X-ray diffraction analyzer (XRD, Bruker Scientific Technology Co., Ltd, D8 DISCOVER) was used to analyze the crystal structure of the high-entropy composite oxide, compared it with the standard database (JCPDS No. 22-1084). The results are recorded in FIG. 3. It is obvious that the crystal form of the high-entropy composite oxide of the present disclosure is a single-phase cubic spinel crystal with the Fd-3m space group.

(3) Valence state analysis: the valence state of each metal element was analyzed in the high-entropy composite oxide with a high-resolution X-ray photoelectron spectrometer (XPS, ULVAC-PHI Inc., PHI 5000 VersaProbe). The results are recorded in FIG. 4A to 4F. It showed that the Co element had both divalent and trivalent ions, and the ratio of $Co^{2+}$ and $Co^{3+}$ was 41.6:58.4; Mn element had divalent, trivalent and tetravalent ions, and the ratio of $Mn^{2+}$, $Mn^{3+}$ and $Mn^{4+}$ is 25.6:35.7:38.7; Fe element had both divalent and trivalent ions, and the ratio of $Fe^{2+}$ to $Fe^{3+}$ was 41.9:58.1; Cr element had both trivalent and hexavalent ions, and the ratio of $Cr^{3+}$ to $Cr^{6+}$ was 70.8:29.2; Ni element had both divalent and trivalent ions, and the ratio of $Ni^{2+}$ to $Ni^{3+}$ was 53.4:46.6.

(4) Element concentration analysis: the concentration of each metal element in the high-entropy composite oxide was analyzed by inductively coupled plasma mass spectrometer (ICP-MS, Thermo-Element XR). The results are recorded in Table 1.

TABLE 1

| | Element | Co | Cr | Fe | Mn | Ni |
|---|---|---|---|---|---|---|
| Preparation Example 1 | concentration (mol %) | 30.2 | 11.2 | 8.0 | 28.6 | 22.0 |

Example 1

Preparation of the Lithium-Ion Battery

Preparation of anode material: the high-entropy composite oxide prepared in the above preparation example 1 was used as the active material; carbon black is the conductive material; and polyvinylidene fluoride is the adhesive.

Seventy percent by weight of active material, 20% by weight of conductive material and 10% by weight of adhesive were weighed and dissolved in N-methylpyrrolidone (NMP) to form a slurry. Then, the slurry was coated on copper foil with a doctor blade, and dried at 90° C. in a vacuum for 6 hours, rolled and punched to form an electrode conforming to CR2032 button battery, wherein the active material of the anode material was loaded at 1.5 (±0.1) mg/cm$^2$.

Assembly of a lithium-ion battery: lithium metal foil was used as the cathode, and glass fiber is used as the separator. The electrolyte was composed of 1M lithium hexafluoride phosphate (LiPF$_6$) conductive lithium salt, and solvent contained ethylene carbonate and diethyl carbonate (at a volume ratio of 1:1); the above-mentioned anode, cathode, separator and electrolyte were combined to form a button-type lithium-ion battery under the environment of humidity and oxygen concentration of 0.5 ppm and argon gas.

Figure 5A:
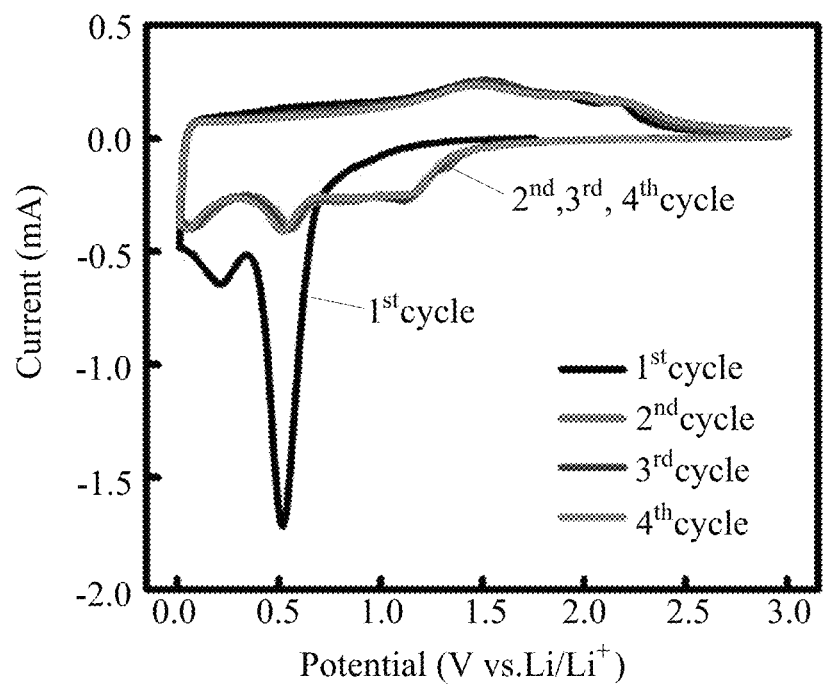
FIG. 5A is a scanning voltammogram of the lithium-ion battery according to an embodiment of the present disclosure.
Figure 5B:
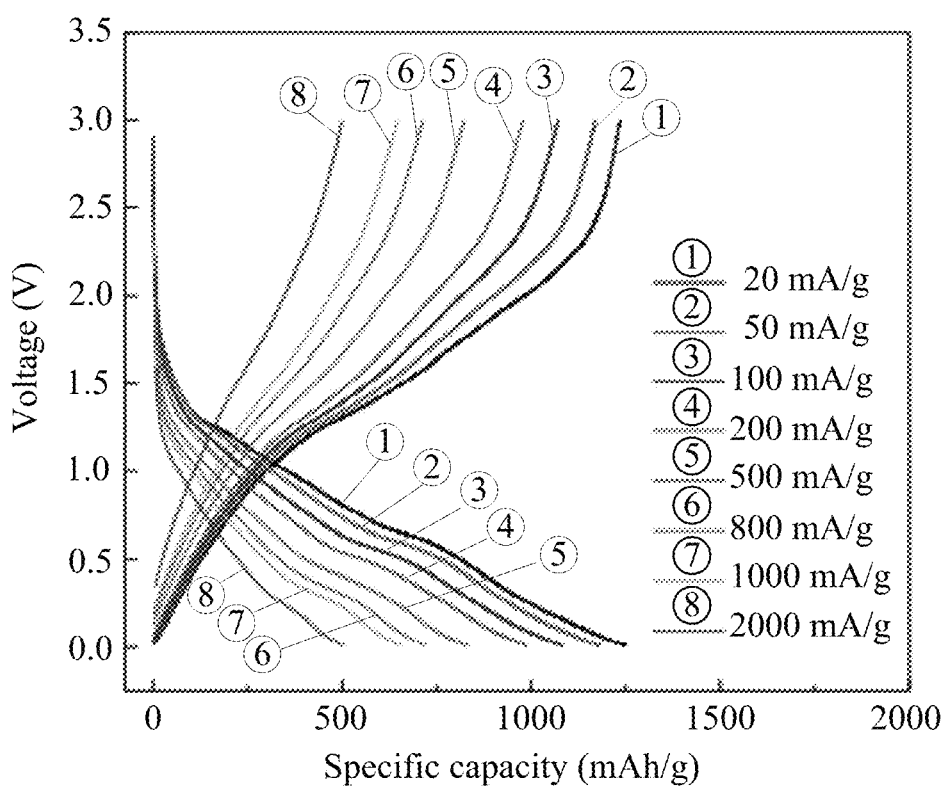
FIG. 5B is a plot of voltage vs. capacity of the lithium-ion battery under different rates of charging and discharging conditions according to the embodiment of the present disclosure.

Finally, the lithium-ion battery prepared above was analyzed as follows:

(1) Scanning voltammetry and charge-discharge test: an electrochemical impedance analyzer (Hengmao Co., Ltd., Biologic VSP-300) was used under the setting condition of a potential scan rate of 0.1 mV/S, and its voltage scan was carried out in the range of 0 to 3 volts and recorded it in FIG. 5A. Then, the capacitance was measured under different charge and discharge rate conditions. The results are shown in FIG. 5B, which shows that the anode material of the present disclosure has a great capacitance and good electrochemical stability.

Figure 6:
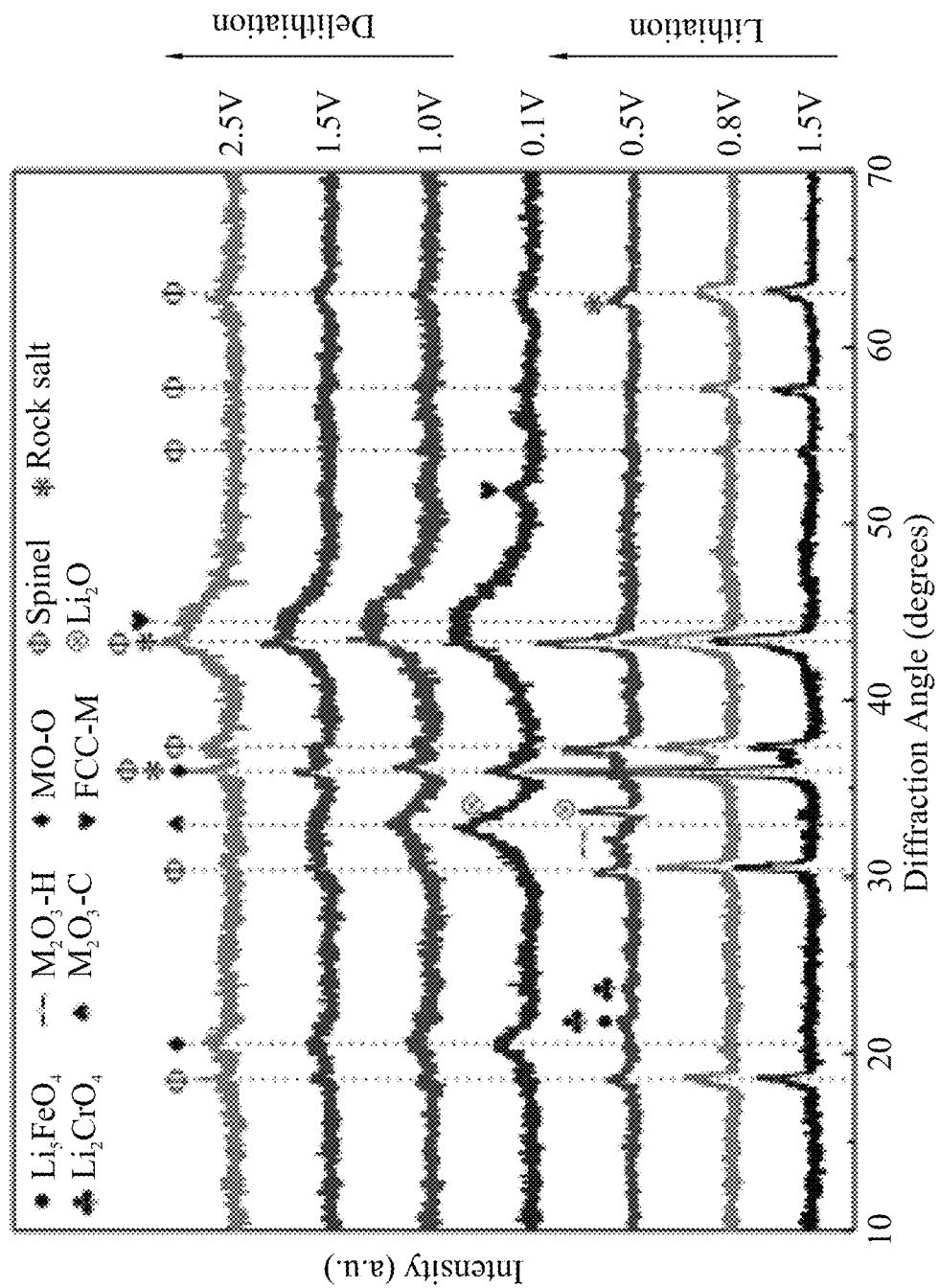
FIG. 6 is an X-ray diffraction spectrogram of the anode material of a lithium-ion battery according to an embodiment of the present disclosure.

(2) Change of crystal structure: X-ray diffraction analyzer (XRD, Bruker Scientific Technology Co., Ltd, D8 DISCOVER) was used to analyze the change in the crystal structure of the anode material during the charge and discharge process. The results are recorded in FIG. 6.

When the voltage was scanned from 1.5 to 0.1V, the lithium-ion battery was in the charging process, that is, lithiation of the anode material; and when the voltage was scanned from 1.0 to 2.5V, the lithium-ion battery was in the discharging process, that is, delithiation of the anode material. It is seen from FIG. 6 that when the voltage was scanned from 1.5 to 0.5V, the characteristic peak (35.7°) of a metallic phase of the spinel structure in the anode material gradually decreased, and $Li_5FeO_4$ and $Li_2CrO_4$ lithium intercalation compounds gradually appeared, and the $Li_2O$ was formed by high-entropy composite oxide at the same time. However, it could still be seen that the metallic phase of hexagonal crystal stacked ($M_2O_3$—H, wherein M represents Mn, Fe, Co, Ni, Cr); when the voltage was scanned to 0.1V, the degree of lithiation was further improved. At this time, although the characteristic peaks of $M_2O_3$—H disappeared, the characteristic peaks of metallic phases of a face-centered cubic structure (FCC-M), metallic phases of orthorhombic structure (MO—O), and metallic phases of cubic crystals ($M_2O_3$—C), and the metallic phase of the rock salt structure were present. Even when the voltage was scanned at a lower voltage, the characteristic peaks of the metallic phase of the rock salt structure still existed, which indicated the maintenance of the crystal oxide framework thereof facilitated the reduction and reconstruction of the high-entropy composite oxide. When the voltage was scanned from 1.0 to 2.5V, the characteristic peaks of the metallic phase of the spinel structure gradually recovered, showing the recovery ability of the high-entropy composite oxide, and corresponding to the reversible behavior of the scanning voltammogram. This confirms that the anode material produced by the present disclosure is characterized by electrochemical stability.

Figure 7:
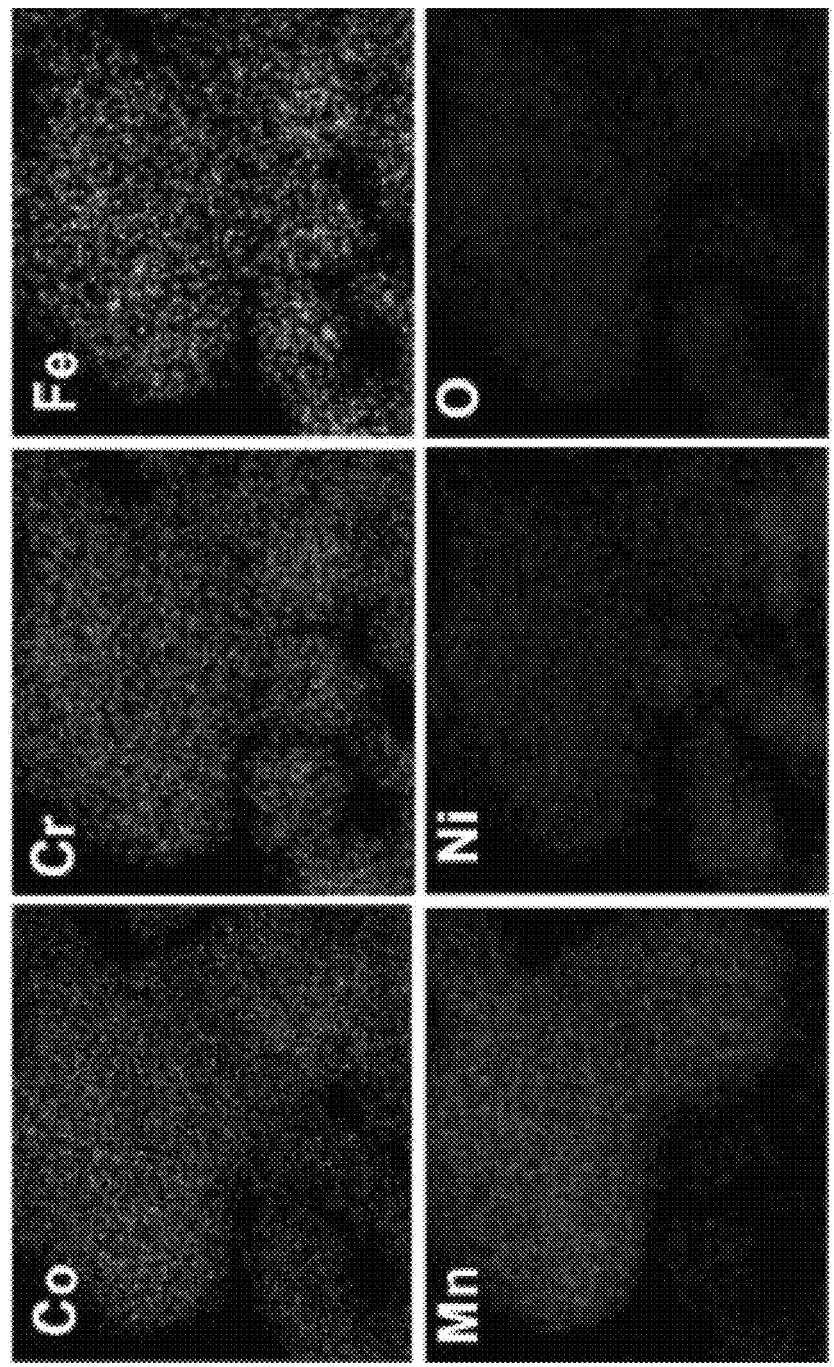
FIG. 7 is an energy dispersive X-ray spectrogram of the anode material of the lithium-ion battery according to an embodiment of the present disclosure.

(3) Analysis of energy dispersive X-ray spectrum: the changes of the element distribution in the anode material was analyzed after the first cycle by a transmission electron microscope (TEM, Jiedong Co., Ltd., JEOL JEM-2100F). The results are recoded in FIG. 7, which shows the metal elements uniformly distributed after the charging and discharging processes.

(4) Impedance: an electrochemical impedance analyzer (Hengmao Co., Ltd., Biologic VSP-300) was used. The results are recorded in FIG. 8. The intersection of the spectra with x axis in high frequency range represents solution resistance ($R_e$). The semicircle in medium-high frequency is related to the charger transfer resistance ($R_{ct}$), and the value of $R_{ct}$ is in positive correlation to semicircle diameter. The slope line at low frequency is inversely related to Warburg impedance (W) corresponding to $Li^+$ transport in anode materials. The EIS data is fitted with the equivalent circuit of the following model to obtain the above-mentioned values.

Figure 8:
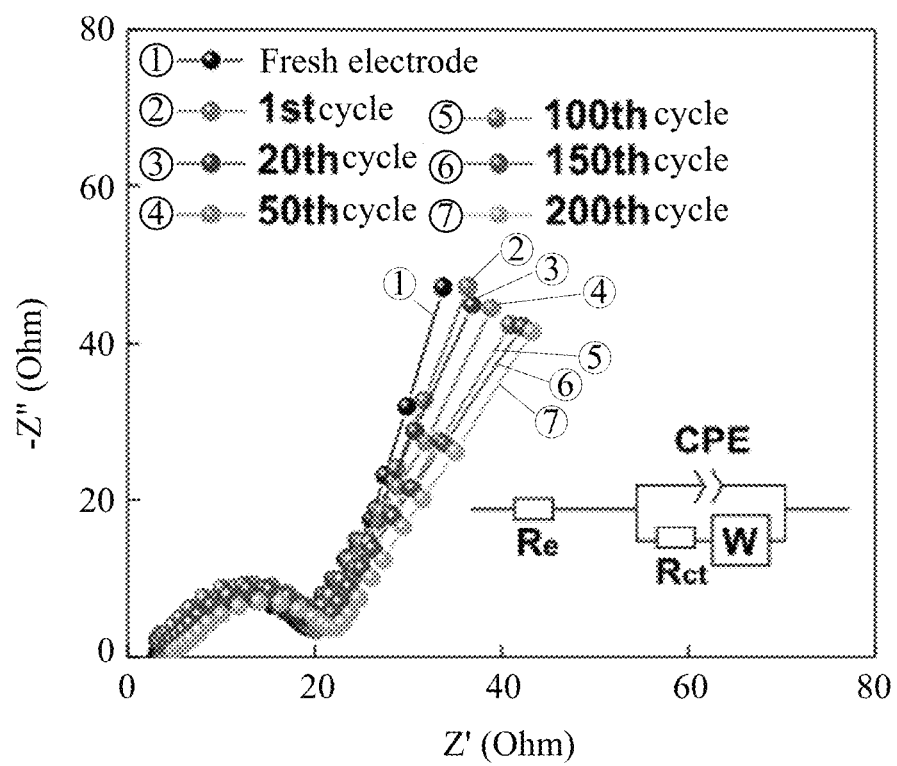
FIG. 8 is a plot of the electrochemical impedance spectroscopy of a lithium-ion battery according to an embodiment of the present disclosure, where the leftmost line to the rightmost line are the starting electrode, the first cycle, the 20th cycle, the 50th cycle, the 100th cycle, the 150th cycle and the 200th cycle.

Compared with traditional anode materials, when the number of charge and discharge cycles increases, there will be agglomeration and pulverization of active materials. A build-up layer is formed on the electrode and solid electrolyte interface, which causes the $R_{ct}$ of its impedance to increase. The results in FIG. 8 show that the $R_{ct}$ of the anode material made by the present disclosure does not have this phenomenon, which shows that the anode material of the present disclosure has stable impedance.

Figure 9:
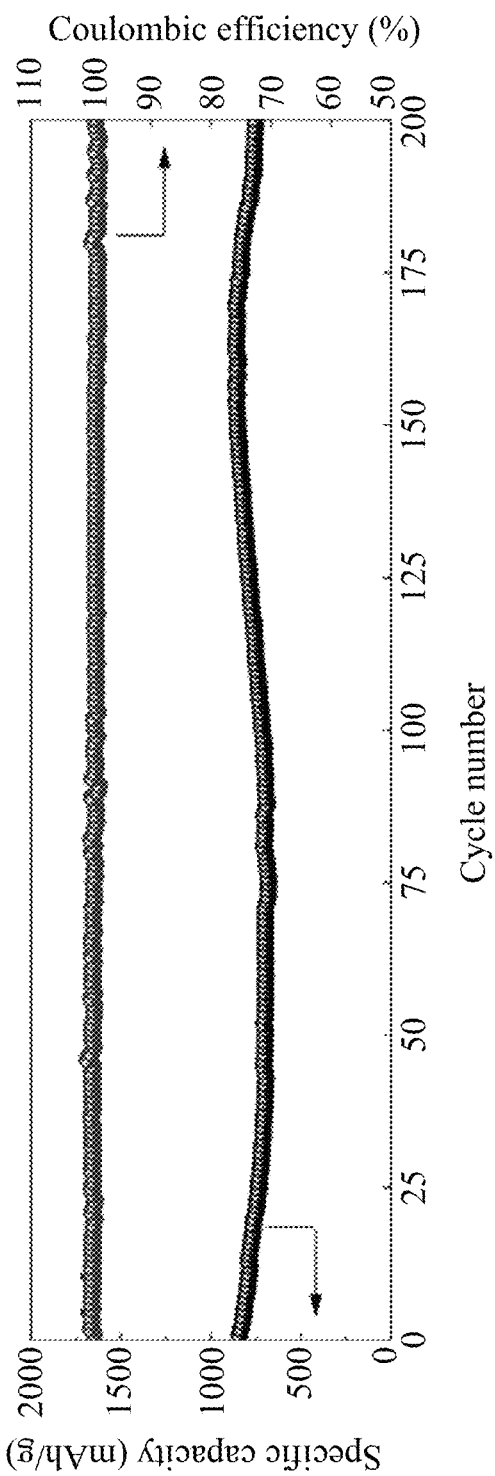
FIG. 9 is a long-term charge-discharge cycle stability diagram of a lithium-ion battery according to an embodiment of the present disclosure.

(5) Stability of electric cycle: a charge-discharge tester (Hengmao Co., Ltd., Biologic VSP-300) was used to repeat charge and discharge several times at room temperature to measure the electric capacity of the lithium-ion battery in each cycle. The results are recorded in FIG. 9. It is obvious that the lithium-ion battery prepared by the present disclosure has good cycling ability.

Figure 10A:
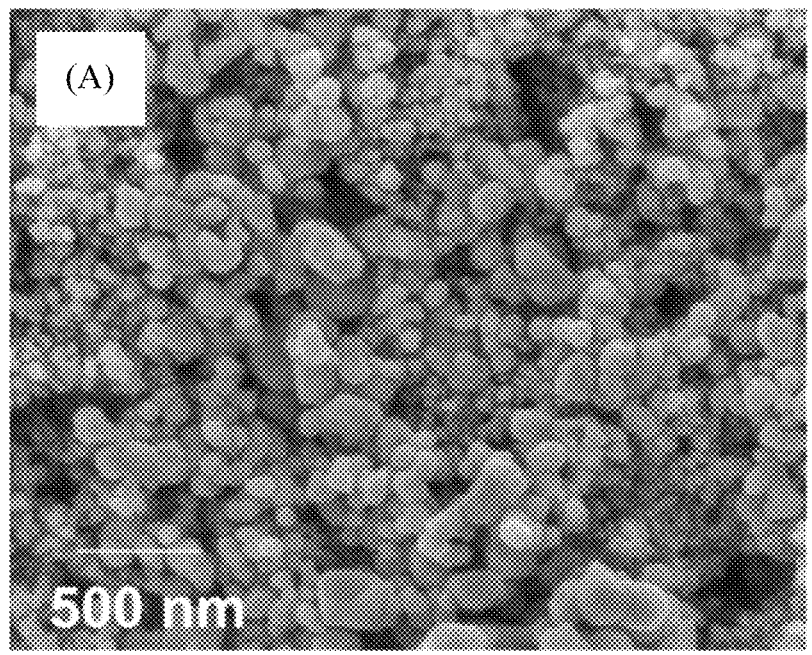
FIGS. 10A and 10B are the surface topographies of the anode material of the lithium-ion battery according to an embodiment of the present disclosure observed by scanning electron microscope before and after the charge and discharge cycles.
Figure 10B:
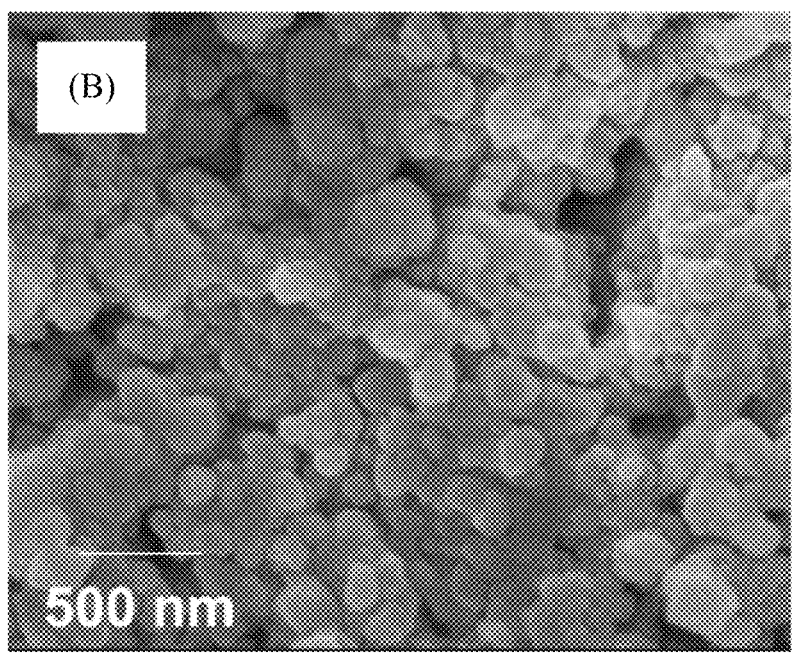

(6) Surface observation before and after the cycle: the surface morphology of the anode material is observed before and after the charge and discharge cycles with a scanning electron microscope (SEM, Jiedong Co., Ltd., JEOL 6701F). The results are recorded in FIGS. 10A and 10B, which show that the surface structure of the anode material in the present disclosure is intact, which is different from the cracks and agglomerations of the traditional anode material after the charge and discharge cycles. Such result shows the cycle stability of the anode material of the present disclosure.

Example 2

Preparation of a Lithium-Ion Battery

Preparation of high-entropy composite oxide: the preparation was the same as Preparation Example 1, except that the precursor salt was 26.67 mol % of cobalt(II) nitrate hexahydrate, 13.33 mol % of chromium(III) nitrate nonahydrate, 13.33 mol % of iron(III) nitrate nonahydrate, 26.67 mol % of manganese(II) nitrate hexahydrate and 20 mol % of nickel(II) nitrate hexahydrate to obtain a high-entropy composite oxide with the element ratio of Co:Mn:Fe:Cr:Ni of 2:2:1:1:1.5.

Preparation of anode material and assembly of a lithium-ion battery: the preparation was the same as in Example 1, and the lithium-ion battery prepared above was tested for electrical cycle stability and recorded in Table 2. The charge and discharge cycles were repeated 300 times under the set conditions of the charge and discharge rates being 500 mA/g. It shows that the lithium-ion battery still maintained 93% of the initial capacitance.

TABLE 2

| Rate of charge and discharge (mA/g) | Charging capacity (mAh/g) | Discharge capacity (mAh/g) |
| --- | --- | --- |
| 50 | 1241 | 1184 |
| 100 | 1199 | 1179 |
| 200 | 1046 | 1030 |
| 500 | 907 | 890 |
| 800 | 786 | 770 |
| 1000 | 716 | 710 |
| 2000 | 568 | 558 |
| 3000 | 453 | 442 |

Example 3

Preparation of a Lithium-Ion Battery

Preparation of high-entropy composite oxide: the preparation was the same as Preparation Example 1, except that the precursor salt was 23.08 mol % of cobalt(II) nitrate hexahydrate, 15.38 mol % of chromium(III) nitrate nonahydrate, 15.38 mol % of iron(III) nitrate nonahydrate, 23.08 mol % of manganese(II) nitrate hexahydrate and 23.08 mol % of nickel(II) nitrate hexahydrate, to obtain a high-entropy composite oxide with the element ratio of Co:Mn:Fe:Cr:Ni of 1.5:1.5:1:1:1.5.

Preparation of anode material and assembly of a lithium-ion battery: the preparation was the same as in Example 1, and the lithium-ion battery prepared above was tested for electrical cycle stability. The results are recorded in Table 3. The charge and discharge cycles were repeated 200 times under the set condition of the charge and discharge rates being 500 mA/g. It shows that the lithium-ion battery still maintains 55% of the initial capacitance.

TABLE 3

| Rate of charge and discharge (mA/g) | Charging capacity (mAh/g) | Discharge capacity (mAh/g) |
|---|---|---|
| 50 | 1529 | 1494 |
| 100 | 1492 | 1455 |
| 200 | 1291 | 1258 |
| 500 | 1114 | 1086 |
| 800 | 951 | 929 |
| 1000 | 850 | 830 |
| 2000 | 644 | 629 |
| 3000 | 519 | 501 |

Comparative Example 1

Preparation of high-entropy composite oxide: 0.808 grams of iron oxide (III), 0.803 grams of cobalt tetroxide (II, III), 0.833 grams of nickel oxide (II), 0.768 grams of chromium (III) trioxide and 0.966 grams of manganese dioxide (IV) were introduced, and mixed with ball milled in equal molar ratios at 250 rpm for 2 hours to form a mixed powder. Then, the above mixed powder was calcined at 900° C. for 2 hours to obtain a composite oxide with equal molar ratio, and having spinel structure and particle size of 200 to 900 nm.

Figure 11:
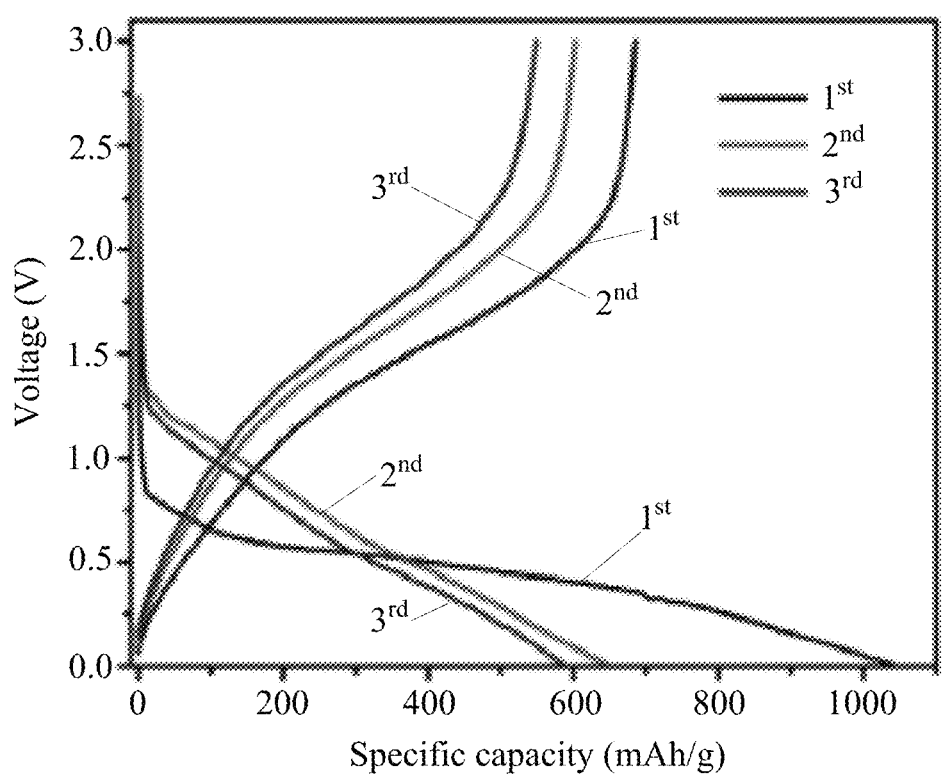
FIG. 11 is a plot of voltage vs. capacity of a comparative example at a charge and discharge rate of 100 mA/g.

Preparation of anode material and assembly of a lithium-ion battery: the preparation was the same as Example 1, and the lithium-ion battery prepared above was subjected to a charge-discharge test at a charge-discharge rate of 100 mA/g. The results are recorded in FIG. 11.

It may be seen from the figure that the charging capacity of the first cycle of Comparative Example 1 is only 680 mAh/g, which is significantly smaller than the charging capacity of the example of the present disclosure. It is obvious that the high-entropy composite oxide of the present disclosure can increase its effect of specific capacitance of the lithium-ion battery.

In conclusion, with non-isomolar ratio design of the high-entropy composite oxide, the various valence states of cations of the present disclosure are dispersed in the crystal structure to promote the formation of a large number of oxygen vacancies, which can serve as a three-dimensional lithium-ion transmission channel and effectively enhance the lithium-ion conductivity thereof to let the anode material have a high rate of charge discharge capability and increase the specific capacitance of the lithium-ion battery.

On the other hand, the high-entropy composite oxide of the present disclosure has a spinel crystal, which increases the configuration entropy of the high-entropy composite oxide, and its entropy stabilization effect is beneficial to the regenerative behavior of the high-entropy composite oxide during the lithiation and delithiation processes, providing a anode material comprising the high-entropy composite oxide with redox durability and excellent cycle stability, thereby having a prospect of the application.

The above Examples are used for illustration only but not for limiting the present disclosure. Modifications and alterations may be made to above Examples by anyone skilled in the art without departing from the spirit and scope of the present disclosure. Therefore, the scope claimed by the present disclosure should be defined by the appended claims, and should be encompassed within the disclosure of the present disclosure without affecting the effects and purposes of the present disclosure.

What is claimed is:

1. A high entropy composite oxide having a spinel crystal, the high entropy composite oxide being represented by formula (I):

$$([M_1]_p Mn_q Fe_x Cr_y Ni_z)_3 O_4 \qquad (I)$$

wherein the $[M_1]$ is Co or Ti; $0.23 \leq p \leq 0.32$, $0.23 \leq q \leq 0.32$, $0.08 \leq x \leq 0.15$, $0.12 \leq y \leq 0.15$, $0.16 \leq z \leq 0.23$, and $p+q+x+y+z=1$, and the p, q, x, y and z are not the same value.

2. The high entropy composite oxide of claim 1, wherein the spinel crystal has an $AB_2O_4$ structure, wherein the A contains $[M_1]^{2+}$, $Fe^{2+}$, $Mn^{2+}$ and $Ni^{2+}$, the B contains $[M_1]^{3+}$, $Fe^{3+}$, $Mn^{3+}$, $Ni^{3+}$ and $Cr^{3+}$, and the $[M_1]$ is Co or Ti.

3. The high entropy composite oxide of claim 1, wherein the spinel crystal is a crystal of single-phase cubic spinel with Fd-3m space group.

4. The high entropy composite oxide of claim 1, which are particles with a number average particle size of 100 to 300 nanometers.

5. The high entropy composite oxide of claim 4, wherein the particles have a size distribution of 170±50 nm.

6. A method for preparing the high entropy composite oxide of claim 1, comprising:
subjecting a reaction solution to a hydrothermal reaction, wherein the reaction solution comprises a precursor salt, an oxidizer, and a surfactant dissolved therein, and the precursor salt comprises a $[M1]^{2+}$-containing metal salt, a $Mn^{2+}$-containing metal salt, a $Ni^{2+}$-containing metal salt, a $Fe^{3+}$-containing metal salt, and a $Cr^{3+}$-containing metal salt, and the $[M_1]$ is a metal ion of Co or Ti; and
separating the reaction solution after being subjected to the hydrothermal reaction to obtain the high entropy composite oxide.

7. The method of claim 6, wherein the reaction solution is prepared by dissolving the surfactant and the precursor salt in a solvent, and then introducing the oxidizer into the solvent.

8. The method of claim 7, wherein the solvent is at least one selected from the group consisting of deionized water, isopropanol, ethanol and dimethylformamide.

9. The method of claim 6, wherein a molar ratio of the oxidizer to the precursor salt is 1:1 to 7:1.

10. The method of claim 6, wherein the oxidizer is one selected from the group consisting of urea, sodium hydroxide, potassium hydroxide and ammonia.

11. The method of claim 6, wherein the metal salt is any one selected from of the group consisting of metal nitrates, metal halides, metal acetates, and metal sulfates, and the molarity of the precursor salt in the reaction solution is 0.0125 M to 0.25 M.

12. The method of claim 6, wherein the surfactant is one selected from the group consisting of cetyltrimethylammonium bromide, ammonium fluoride and citric acid.

13. The method of claim 6, wherein a molar ratio of the surfactant to the precursor salt is 1:1.6 to 1:10.

14. The method of claim 6, wherein a temperature of the hydrothermal reaction is 120° C. to 200° C., and the reaction time of the hydrothermal reaction is 4 hours to 24 hours.

15. The method of claim 6, further comprising subjecting the high-entropy composite oxide to a heat treatment after the high-entropy composite oxide is separated and obtained.

16. The method of claim 15, wherein the heat treatment is to treat the high-entropy composite oxide at 400° C. to 1,000° C. for 2 hours to 10 hours.

17. An anode material for a lithium-ion secondary battery, comprising the high entropy composite oxide of claim 1.

18. The anode material of claim 17, wherein the weight percentage of the high entropy composite oxide in the anode material is 70% to 80% by weight.

* * * * *